United States Patent [19]
Sakaue et al.

[11] Patent Number: 5,264,199
[45] Date of Patent: Nov. 23, 1993

[54] PROCESS FOR PRODUCING CARBON BLACK

[75] Inventors: Akinori Sakaue; Shushichi Yoshimura; Shinichi Kanamaru, all of Kitakyushu; Masanori Karatsu, Tokyo, all of Japan

[73] Assignee: Mitsubishi Kasei Corporation, Tokyo, Japan

[21] Appl. No.: 940,790

[22] Filed: Sep. 4, 1992

Related U.S. Application Data

[63] Continuation of Ser. No. 732,356, Jul. 18, 1991, abandoned, which is a continuation of Ser. No. 486,931, Mar. 1, 1990, abandoned.

[30] Foreign Application Priority Data

| Mar. 4, 1989 | [JP] | Japan | 1-51003 |
| May 23, 1989 | [JP] | Japan | 1-127949 |

[51] Int. Cl.$^5$ ............................................. C09C 1/50
[52] U.S. Cl. ............................... 423/449.1; 423/456
[58] Field of Search ............ 423/450, 456, 457, 458, 423/449.1

[56] References Cited

U.S. PATENT DOCUMENTS

| 2,499,438 | 3/1950 | Wiegand et al. | 423/455 |
| 2,769,692 | 11/1956 | Heller | 423/457 |
| 3,301,639 | 1/1967 | DeLand | 423/457 |
| 4,000,250 | 12/1976 | Cheng | 423/456 |
| 4,039,626 | 8/1977 | Johnson | 423/456 |
| 4,402,929 | 9/1983 | Hunt | 423/456 |
| 4,729,885 | 3/1988 | Cheng | 423/456 |
| 4,822,588 | 4/1989 | Gravley et al. | 423/456 |
| 5,069,892 | 12/1991 | Nakai | 423/456 |

FOREIGN PATENT DOCUMENTS 2304029  10/1976  France .

Primary Examiner—Michael Lewis
Assistant Examiner—Stuart L. Hendrickson
Attorney, Agent, or Firm—Oblon, Spivak, McClelland, Maier & Neustadt

[57] ABSTRACT

A process for producing carbon black by utilizing a reactor comprising a first gradually constricted reaction zone in which a mixture of a fuel and an oxygen-containing gas, is burned, a second gradually constricted reaction zone having a throat in which the resulting high temperature combustion gas is mixed and reacted with a hydrocarbon feedstock, and a third reaction zone provided with a quenching water spray for terminating the reaction, which comprises directing the high temperature combustion gas formed in the first reaction zone to form an axial stream flowing in substantially the same direction as the axial direction of the reactor, introducing the divided axial streams into the second reaction zone, and, in the second reaction zone, introducing the hydrocarbon feedstock from nozzles in a direction traversing the axial streams of the high temperature combustion gas.

2 Claims, 6 Drawing Sheets

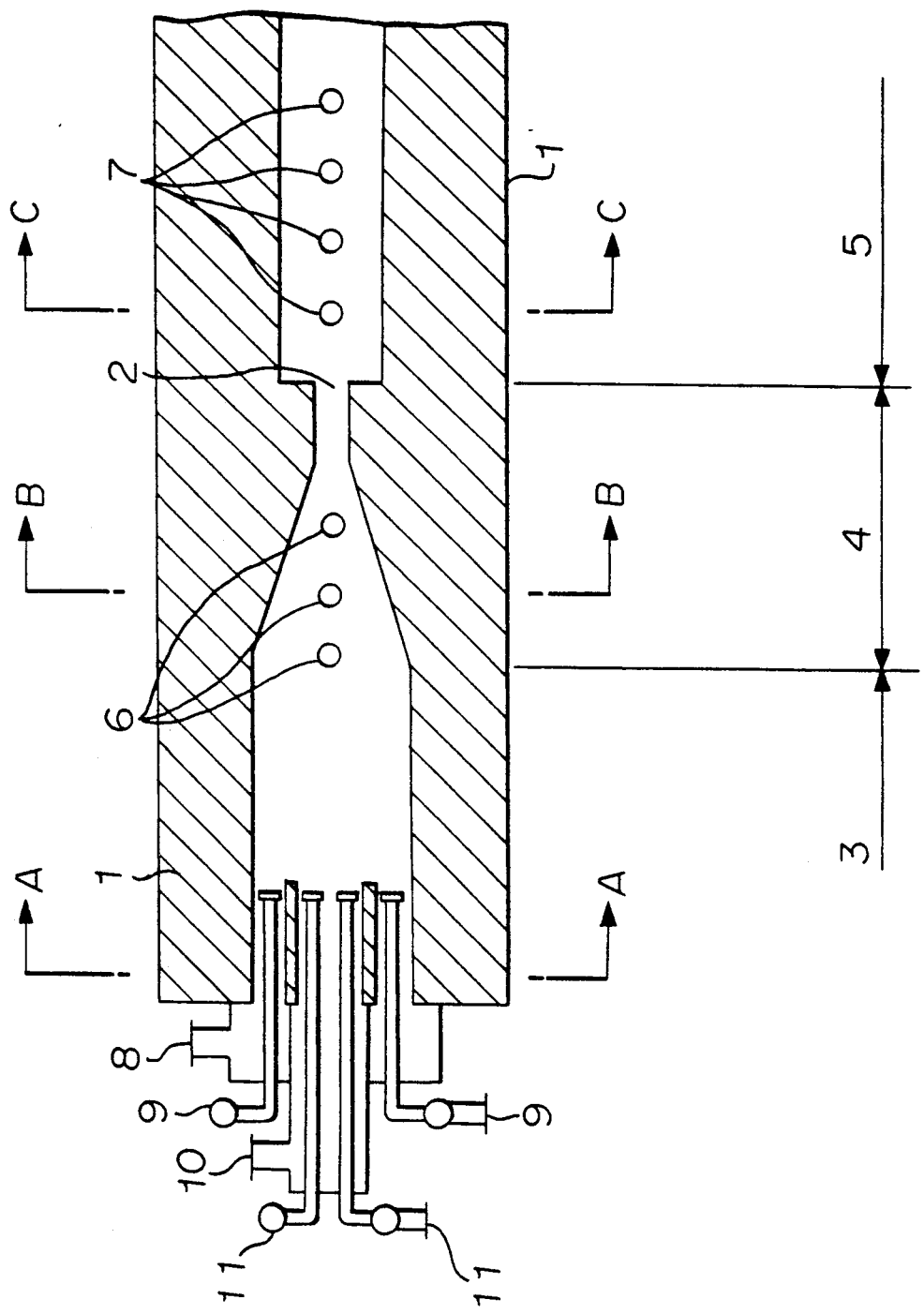

PROCESS FOR PRODUCING CARBON BLACK

This application is a continuation of application Ser. No. 07/732,356, filed on Jul. 18, 1991, now abandoned, which is a continuation of Ser. No. 07/486,931, filed Mar. 1, 1990, also abandoned.

BACKGROUND OF THE INVENTION

1. Field of the Invention

The present invention relates to a process and an apparatus for highly efficiently producing furnace carbon black having desired physical properties useful for applications as filler material, reinforcing material, conductive material, coloring pigment, etc.

2. Description of the Related Art

For producing furnace carbon black, it has been common to introduce an oxygen containing gas and a fuel in the axial or tangential direction of a cylindrical carbon black production reactor, and while transferring the high temperature combustion gas formed by the combustion to a down stream reaction zone, introduce a hydrocarbon feedstock into the high temperature combustion gas stream to form carbon black. However, the thermal decomposition reaction of the hydrocarbon feedstock is complicated, and it has been difficult to form carbon black having desired physicochemical properties with high efficiency.

Especially, to efficiently mix, contact and react the high temperature combustion gas stream formed in the first reaction zone with the hydrocarbon feedstock introduced in the second reaction zone, is regarded as an important factor governing the production efficiency and the properties of the resulting carbon black. Heretofore, for mixing and contacting the high temperature combustion gas with the hydrocarbon feedstock in the second reaction zone, it has been attempted to increase the kinetic energy by giving a strong swirling motion to the high temperature combustion gas, or by modifying the shape of the throat of the second reaction zone. However, no adequately satisfactory results have been obtained. For example, Japanese Examined Patent Publication No. 27112/1980 discloses a process for producing carbon black, which comprises forming hot gas streams divided outwardly and inwardly in the circumferential direction with the reactor axis at the center, and supplying the hydrocarbon feedstock from the axial direction. However, the hot gas stream divided and introduced outwardly, is intended just for the protection of the reactor wall and accordingly will be a cause for substantially reducing the yield of carbon black. Besides, with the introduction of the divided streams from the tangential direction to the reactor axis to the circumferential direction, it is impossible to obtain a highly turbulent flow at the throat. Further, the feedstock supply nozzle is held on the reactor axis, and when the nozzle is moved to control the physicochemical properties of the resulting carbon black, it is necessary to protect the nozzle with a cooling jacket, whereby an extra heat loss is brought about. Besides, with the introduction of the feedstock from the nozzle provided on the reactor axis, it takes time for the diffusion of the feedstock in a radial direction, whereby effective mixing can not be conducted at a high speed, and a reduction in the yield of carbon black is unavoidable.

Further, Japanese Examined Patent Publication No. 45581/1980 discloses a process for producing carbon black, wherein air for combustion is preheated by heat exchanger with the reaction product after quenching, for heat recovery, and a part of the preheated air is supplied to the reactor as an independent divided stream for the protection of the reactor wall. However, in this process, the introduction of the feedstock is limited to the center portion around the reactor axis, and no high temperature combustion gas stream will be formed along the reactor wall, whereby formation of a high temperature turbulent flow region essential for conducting the thermal cracking of the hydrocarbon feedstock with high efficiency, will be inadequate. Besides, the hydrocarbon feedstock is supplied from a feedstock supply nozzle in an axial direction held in the high temperature reactor, whereby it is necessary to provide a cooling jacket for the protection of the nozzle, thus leading to an extra heat loss. Furthermore, since the feedstock is introduced from the reactor axis, it takes time for the diffusion of the feedstock in the radial direction, whereby effective mixing can not be conducted at a high speed, thus leading to a decrease in the yield of carbon black.

Still further, Japanese Unexamined Patent Publication No. 183364/1986 discloses a process for producing carbon black by means of a carbon black production reactor, wherein a combustion chamber is provided with a gas inlet directed in a tangential direction, wherein a feedstock is introduced into its throat in a direction traversing the gas stream for thermal cracking. However, the high temperature combustion gas stream is a swirling stream, and it is incapable of forming an adequate high temperature turbulent flow region at the throat i.e. at the supply point of the feedstock, whereby it is impossible to form carbon black with high efficiency.

Japanese Examined Patent Publication No. 6203/1972 discloses a process for producing carbon black, wherein turbulence is created by a plurality of burners disposed at an angle of from 10 to 80° to the reactor axis, and a hydrocarbon feedstock is supplied to intersect the turbulence. However, the reactor having the burners attached thereto has a truncated cone shape with its cross-sectional area gradually increasing towards the throat (diaphragm), whereby the turbulent flow obtained by the intersection of the combustion mixture streams diminishes towards the throat, whereby the turbulent flow energy of the combustion mixture streams and the turbulent flow energy obtained by the shape of the throat are not utilized effectively. Further, the introduction of the hydrocarbon feedstock is in the axial direction of the reactor, whereby the introduced hydrocarbon feedstock is obliged to diffuse in the radial direction of the reactor, and it is impossible to introduce the hydrocarbon feedstock swiftly and collectively to the area where the turbulent flow energy is maximum. Accordingly, the control to obtain a carbon black having optional desired properties, is very difficult, and it is particularly difficult to produce carbon black having a small particle size.

Further, in Japanese Examined Patent Publication No. 10581/1987, a plurality of carbon black intermediate gas streams formed separately, are collided with each other. However, the collision in this case is collision of carbon black intermediate gas streams themselves after introduction of a hydrocarbon feedstock, and the turbulent flow energy by the collision does not serve for efficient formation of carbon black. Further, the convergence of carbon black intermediate gas streams is conducted by an assembly of at least two first and second reaction zones, and it is likely that the carbon black intermediate products have already formed before the assembly. Consequently, the physical properties (quality) of the carbon black product tend to substantially vary. Further, if the number of series for the assembly increases, an increase of the surface area of the main body of the reactor is unavoidable, whereby the heat loss from the surface of the reactor increases, and the energy efficiency decreases.

SUMMARY OF THE INVENTION

It is an object of the present invention to provide a process and an apparatus for producing carbon black, whereby carbon black having desired physicochemical properties depending upon the particular application can be produced with high efficiency.

Firstly, the present invention provides a process for producing carbon black by means of a reactor comprising a first reaction zone in which a mixture of a fuel and an oxygen containing gas, is burned, a second reaction zone having a throat in which the resulting high temperature combustion gas is mixed and reacted with a hydrocarbon feedstock, and a third reaction zone provided with a quenching water spray for terminating the reaction, which comprises directing the high temperature combustion gas formed in the first reaction zone to form an axial stream flowing in substantially the same direction as the axial direction of the reactor, dividing the axial stream into at least two independent streams differing in the spouting velocity and/or the spouting gas temperature, introducing the divided axial streams into the second reaction zone, and, in the second reaction zone, introducing the hydrocarbon feedstock from nozzles in a direction traversing the axial streams of the high temperature combustion gas.

Secondly, the present invention provides a process for producing carbon black by a reaction conducted in a first reaction zone in which by a high temperature combustion mixture-generating system, an oxygen containing gas and a fuel are mixed to form a high temperature combustion mixture stream, a second reaction zone having a throat in which the high temperature combustion mixture stream thus obtained, is mixed with a hydrocarbon feedstock to form carbon black, and a third reaction zone located down stream and continuous from the second reaction zone in which quenching water is sprayed to terminate the reaction, which comprises:

① introducing said high temperature combustion mixture stream in the form of a plurality of independent streams directed substantially in an axial direction formed by a plurality of high temperature combustion mixture-generating systems, respectively;

② letting said plurality of independent streams of the high temperature combustion mixture collide with each other in the first reaction zone of an axially gradually constricted shape or in the second reaction zone having a throat; and ③ introducing the hydrocarbon feedstock in the second reaction zone from a direction traversing the high temperature combustion mixture streams.

Further, the present invention provides an apparatus for producing carbon black comprising a first reaction zone in which by a high temperature combustion mixture-generating system, an oxygen containing gas and a fuel are mixed to form a high temperature combustion mixture stream, a second reaction zone in which the high temperature combustion mixture stream thus obtained, is mixed with a hydrocarbon feedstock to form carbon black and a third reaction zone located down stream and continuous from the second reaction zone in which quenching water is sprayed to terminate the reaction, wherein a plurality of said high temperature combustion mixture-generating systems are provided so that they are capable of spouting the respective high temperature combustion mixture streams to optional positions in the first and second reaction zones, the second reaction zone is shaped so that it is substantially axially gradually constricted, and hydrocarbon feedstock supply nozzles are provided in a direction traversing the high temperature combustion mixture streams in the second reaction zone.

In the accompanying drawings:

BRIEF DESCRIPTION OF THE DRAWINGS

FIG. 1 is a vertical cross sectional diagrammatical view of the main portion of a carbon black production reactor useful for carrying out the process of the first aspect of the present invention.

FIG. 2-1 is a cross sectional diagrammatical view taken along line A—A in FIG. 1.

FIG. 2-2 is a cross sectional diagrammatical view taken along line B—B in FIG. 1.

FIG. 2-3 is a cross sectional diagrammatical view taken along line C—C in FIG. 1.

FIGS. 3-1 to 3-4 are cross sectional views of the first reaction zone showing various types of independent streams of axial streams.

FIG. 4 is a vertical cross sectional diagrammatical view of the second reaction zone illustrating the feed nozzles.

DESCRIPTION OF THE PREFERRED EMBODIMENTS

Figures 1, 2:
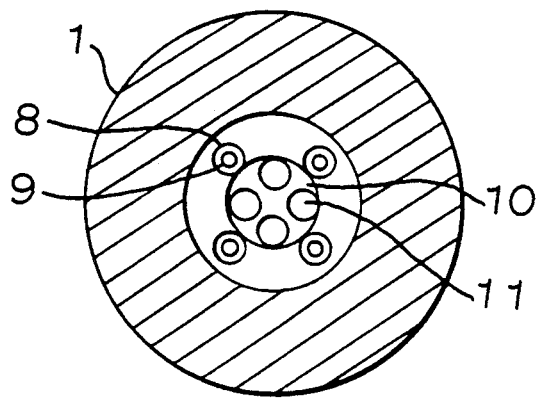
Figure 2:
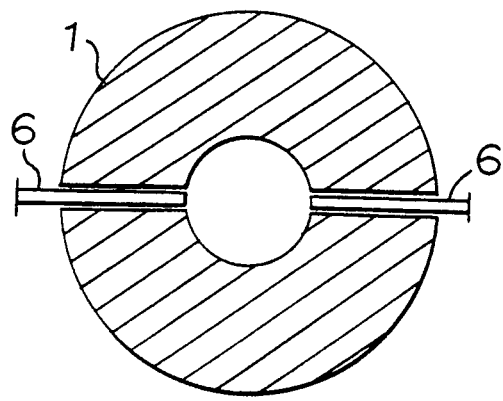

According to the studies by the present inventors, the efficiency of the reaction for the formation of carbon black and the physical properties (quality) of the product, largely depend on three factors of the minimum value $(1_K)_{min}$ of the Kolmogorov minimum eddy diameter $1_K$ formed by the high temperature combustion gas in the internal space of the reactor, the distribution thereof and the proportion $(Q)1_K/Q$ of the feedstock flow rate passing through the region where $(1_K)_{min}$ exists.

Here, the Kolmogorov minimum eddy diameter $1_K$ is one of parameters representing the turbulent flow characteristic factor led by a turbulent flow theory in hydrodynamics and is known per se.

Now, the experimental analysis and discussion which led to the above findings, will be described.

The present inventors have conducted various experiments by using a carbon black reactor for experimental purpose. As a result, it has been found that the following qualitative relations exist between the physicochemical properties of carbon black such as the lower limit of particle diameter, the structure index, the particle size distribution, the aggregate size distribution and the yield relative to the feedstock, and the geometric conditions of the reactor. In the following formulas, dc is the diameter of the reactor throat, $\theta$ is the corn-shaped angle thereof, and Lc is the distance between the feed nozzle to the throat.

Lower limit of particle size $\propto (dc/\theta)$
Tinting strength $\propto (1/Lc)$
Particle size distribution $\propto (Lc)$
Aggregate size distribution $\propto (Lc)$
Particle size distribution $\propto (1/yield)$ The phenomenal characteristics obtained here were physically interpreted, through flow experiments, as follows.

Namely, when the velocity U of the high temperature combustion gas in the reactor is represented by the formula:

$$U = u + u'$$

where u is the average velocity component and u' is the variable velocity component, the throat diameter dc, the corn-shaped angle $\theta$ and the distance Lc from the feed nozzle to the throat, give direct influence as shown below, to the average velocity component u of the combustion gas, the constricted low velocity at the throat i.e. the maximum velocity $(u)_{max}$ in the cross sectional velocity distribution, and the average retention time $\tau$ of the hydrocarbon feedstock in the reactor and its distribution $\sigma$, respectively:

$$(dc)^2 \propto 1/(u)$$

$$(\theta) \propto (u)_{max}$$

$$(Lc) \propto (\tau, \sigma)$$

An increase of the average velocity component u of the combustion gas would be accompanied by an increase of the maximum velocity $(u)_{max}$ in the cross sectional velocity distribution. Therefore, $(\theta/dc)$ is considered to be related to $(u)_{max}$.

Here, taking into consideration the dependency of the basic physical properties of carbon black on the absolute value of the size of fine particles, $(u)_{max}$ will be considered in relation with the fine structure of a turbulent flow formed by the combustion gas stream. According to a turbulent flow theory, an increase of the velocity is proportional to an increase of the variable velocity component, and the following formula is thereby led:

$$(u)_{max} \propto (u')_{max}$$

and, the variable velocity component has a relation represented by the following formula with the Kolmogorv minimum eddy current diameter $1_K$:

$$1_K = 1_o(1_o \cdot u'/v)^{-\frac{3}{4}}$$

where $1_o$ represents a length corresponding to the diameter of the reactor at that position and v represents the kinematic viscosity of the fluid.

Accordingly, the maximum variable velocity $(u')_{max}$ formed in a certain region in the reactor generates the minimum value $(1_K)_{min}$ of the minimum eddy current diameter $1_K$ in that region.

$$(1_K)_{min} = 1_o(1_o \cdot (u')_{max}/v)^{-\frac{3}{4}}$$

Namely, parameter $(\theta/dc)$ is believed to indicate the tendency for fine eddy and indicate that the fine eddy is essential for the formation and development of aggregates.

Lower limit of particle diameter $\propto (1_K)_{min}$

Now, the distance Lc from the feed nozzle to the throat will be discussed. An increase of Lc increases the distance for the passage of the feedstock through the reactor and the diffusion of the feedstock in the radial direction, and is believed to increase both the average retention time $\tau$ of the feedstock in the reactor and its distribution $\sigma$. Therefore, model experiments were conducted, and as a result, the following formula was obtained.

$$(\tau) \propto (\sigma)$$

This indicates that the particle size distribution is in proportion to the distribution $\sigma$ of the average retention time $\tau$ of the feedstock in the reactor.

The smaller the distribution $\sigma$, the better the quality of the carbon black. It is possible to reduce the distribution $\sigma$ by reducing the average retention time $\tau$ by shortening Lc. However, as is evident from the fact that the position for termination of the thermal cracking reaction is subject to control for adjustment of the quality, the improvement of the distribution $\sigma$ should be conducted under the condition where the retention time $\tau$ is constant.

The distribution $\sigma$ of the retention time being small, means that the feedstock supplied at a certain time passes through the reactor in substantially the same route. From this point of view, the quality of carbon black will be controlled by the minimum eddy diameter $(1_K)_{min}$ formed on the route, whereby carbon black having small distributions of various types will be formed.

Tinting strength $\propto (1/\sigma)$
Particle size distribution $\propto (\sigma)$
Aggregate size distribution $\propto (\sigma)$ Further, the relation of particle size distribution $\propto 1/(yield)$ indicates that the yield improves as the distribution decreases. It is assumed that due to the decrease in the distribution, the proportion $(Q)1_{K\ min}/Q$ of the feedstock flow rate passing through the smaller $(1_K)_{min}$ region in its route, increases. Namely, the following formula is assumed to be established.

$$(\sigma) \propto 1/[(Q)1_{K\ min}/Q]$$

As is evident from the foregoing discussion, it is important to increase the proportion $(Q)1_{K\ min}/Q$ of the flow rate of the feedstock passing through the $(1_K)_{min}$ region in the reactor in order to improve the yield.

Carbon black yield $\propto (Q)1_{K\ min}/Q$

To confirm the conclusion of the discussion, an experiment was conducted by changing only the flow rate of the high temperature combustion gas while maintaining all other conditions to be constant. By increasing the flow rate of the high temperature combustion gas, changes of various parameters are expected as follows:

Decrease of $(1_K)_{min}$

Decrease of $(\sigma)$

Increase of $(Q)1_{K\ min}/Q$

Then, the changes in the quality of the carbon black and the yield relative to the flow rate of the high temperature combustion gas were investigated, whereby it was confirmed that high quality and high efficiency can be attained by increasing the combustion gas flow rate. Namely, "to improve the mixing and contacting function at the reaction zone" which used to be understood vaguely, means to satisfy the following conditions:

① To minimize the value of $(1_K)_{min}$.

② To form $(1_K)_{min}$ as localized on the center axis of the reactor apart from the inner wall of the reactor.

③ To apply by spraying the feedstock so that the proportion $(Q)1_{K\ min}/Q$ of the flow rate of the feedstock passing through the region where $(1_K)_{min}$ exists, becomes largest.

The present invention has been accomplished on the basis of the foregoing findings. Namely, in the present invention, firstly, an axial flow type turbulent stream generating system has been adopted. Namely, in order to minimize the value $(1_K)_{min}$ and localize $(1_K)_{min}$ on the center axis of the reactor apart from the inner wall of the reactor, a substantial turbulent stream is required at that region. Therefore, in the present invention, the high temperature combustion gas stream is directed to form an axial stream flowing substantially the same direction as the direction of the reactor axis, and the axial stream is divided into at least two independent streams differing in the spouting velocity and/or the spouting gas temperature, so that generation of an extremely large turbulence can be controlled at any desired region. Yet, the axial stream is free from swirling velocity components, whereby the maximum velocity in the axial direction can naturally be localized on the axis on the reactor. Further, the value of $(1_K)_{min}$ and the position of the region for its presence can be controlled by appropriately adjusting the spouting velocities or spouting angles of a plurality of high temperature combustion gas streams, whereby the physical properties of the resulting carbon black can readily be controlled.

Further, in order to maximize the proportion $(Q)1_{K\ min}/Q$ of the flow rate of the feedstock passing through the localized region of $(1_K)_{min}$, it is necessary to introduce the hydrocarbon feedstock so that it flows along the axis of the reactor. As a method for introducing the feedstock to meet this requirement, there are two methods i.e. a first method wherein the feedstock is introduced from a nozzle held on the axis of the reactor, and a second method wherein the feedstock is introduced from the side in a direction perpendicular to the axis of the reactor. In the present invention, the latter method has been adopted. The reason is as follows. Namely, in the former method for introduction, the introduced feedstock tends to be dispersed in a radial direction before it reaches the region where $(1_K)_{min}$ exists, whereby not only the proportion $(Q)1_{K\ min}/Q$ of the flow rate of the feedstock passing through the $(1_K)_{min}$ region decreases, but also a cooling jacket is required to protect the feed nozzle held in the high temperature reactor, thus leading to an extra heat loss.

Whereas, in the latter method employed by the present invention, the diffusion of the feedstock in the radial direction is controlled to be minimum by the high temperature combustion gas crossing at a high velocity, whereby the feedstock is mixed at a high speed in a narrow region without spreading. As a result, the proportion $(Q)1_{K\ min}/Q$ of the flow rate of the feedstock passing through the $(1_K)_{min}$ region increases, and yet no jacket for cooling the nozzle is required and thus the corresponding heat loss can be avoided. Thus, by introducing the feedstock from the side in a direction traversing the axial streams of the high temperature combustion gas, it is possible to increase the proportion of the flow rate of the feedstock passing through the region where $(1_K)_{min}$ exists, i.e. to improve the effective volume efficiency or the effective mixing efficiency, and consequently to remarkably improve the yield of carbon black per the reactor volume.

Namely, according to the present invention, (1) the high temperature combustion gas stream is directed to form an axial stream, whereby a swirling velocity component can be eliminated, and the hydrocarbon feedstock can efficiently be thermally decomposed to form carbon black in good yield. Further, (2) the axial stream of the high temperature combustion gas is divided into at least two independent streams differing in the spouting velocity and/or the spouting gas temperature, so that the spouting velocities and/or the spouting gas temperatures of the each independently divided streams can be varied in various ways, whereby it is possible to control the physicochemical properties of the resulting carbon black, such as the tinting strength or the specific surface area, and it is readily possible to obtain various carbon blacks having desired physical properties depending upon various applications by using one and the same production reactor. Furthermore, (3) since the hydrocarbon feedstock is introduced in the direction traversing the axial streams, the dispersion of the feedstock in the radial direction can be minimized, whereby carbon black having a sharp particle size distribution and having high tinting strength can be obtained in good yield, and it is possible to avoid a heat loss due to the jacket for cooling the feed nozzle.

In the present invention, the high temperature combustion gas can be obtained by mixing a gaseous or liquid fuel with air, oxygen or a mixture thereof, and burning the mixture. As the fuel, a gaseous fuel such as hydrogen, carbon monoxide, methane, natural gas, coal gas or petroleum gas; a petroleum-originated liquid fuel such as kerosine, gasoline or heavy oil; or a coal-originated fuel such as creosote oil, naphthalene oil or carbolic acid oil, may suitably be employed.

As the hydrocarbon feedstock in the present invention, an aromatic hydrocarbon such as benzene, toluene, xylene, naphthalene or anthrathene; a coal-originated hydrocarbon, such as creosote oil or carbolic acid oil; a petroleum-originated heavy oil such as ethylene heavy oil or FCC oil; an acetylene-type unsaturated hydrocarbon; an ethylene-type hydrocarbon; or an aliphatic hydrocarbon such as pentane or hexane, may suitably be employed.

In the second aspect of the present invention, the high temperature combustion mixture stream formed in the first reaction zone is introduced in the form of a plurality of independent streams formed by a plurality of high temperature combustion mixture-generating systems.

The plurality of independent streams are permitted to collide with each other in the first and second reaction zones shaped to be axially gradually constricted, to control the absolute value of the above-mentioned $(1_K)_{min}$ and its distribution. At the same time, in the second reaction zone where this $(1_K)_{min}$ exists, the hydrocarbon feedstock is introduced from a direction traversing the high temperature combustion mixture streams, whereby the introduced hydrocarbon feedstock can be swiftly and easily dispersed and mixed throughout the entire region wherein the $(1_K)_{min}$ exists. Thus, the control of the physical properties of carbon black is easy, and at the same time, it is possible to form the carbon black efficiently.

The physical properties of the resulting carbon black, accordingly the types of the resulting carbon black, can efficiently be controlled particularly when various controls are combined including a control (change) of the manner of division of the high temperature combustion mixture stream or the manner of the collision of the divided independent streams, a control (change) of the fuel or the oxygen-containing gas flow rate of each independent stream, and a control (change) of the position at which the hydrocarbon feedstock is introduced in correspondence to the manner of division or the manner of collision.

Now, the present invention will be described in further detail with reference to the drawings.

Figures 2, 3:
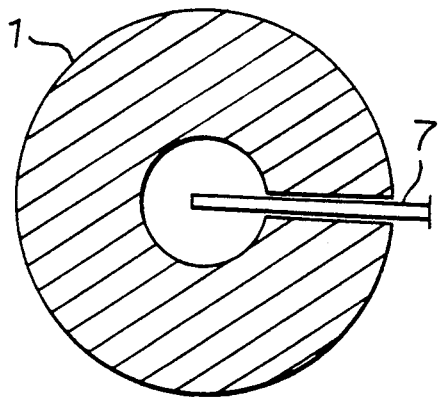
Figures 1, 3:
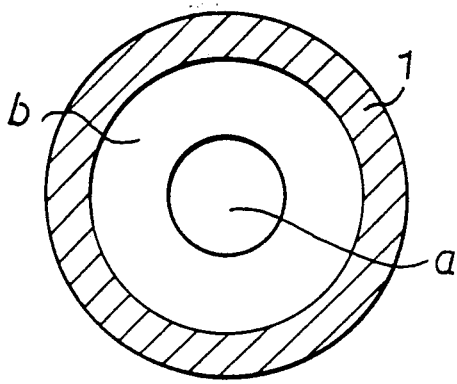
Figures 2, 3:
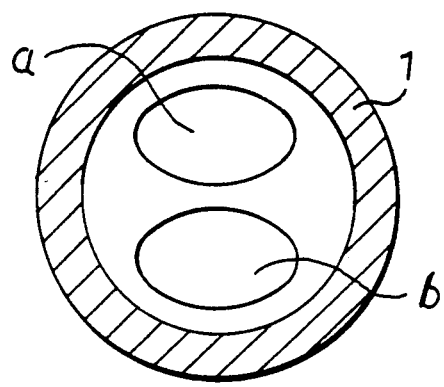
Figure 3:
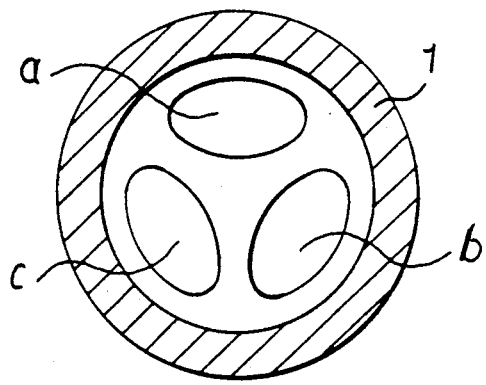
Figures 3, 4:
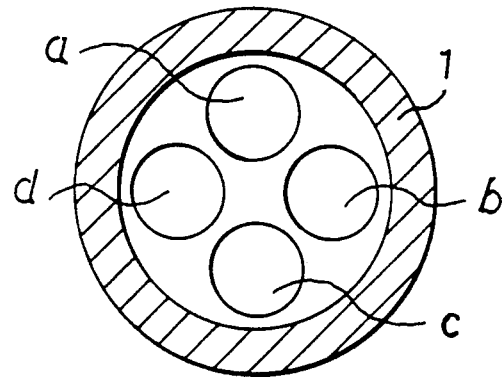
Figure 4:
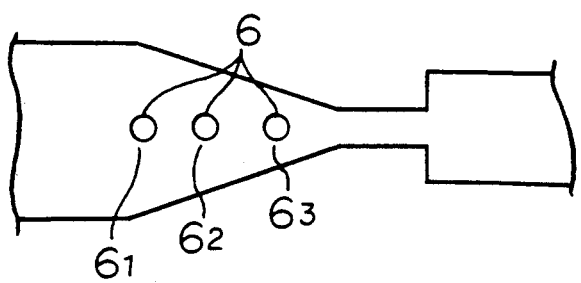
Figure 5:
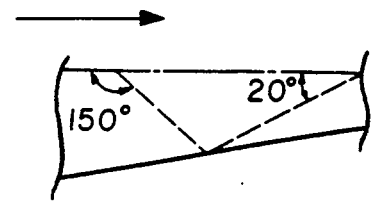
FIG. 5 is a view illustrating the direction for introducing the feedstock.

(A) In the accompanying drawings, FIG. 1 illustrates an embodiment of a carbon black production reactor to be used for carrying out the process according to the first aspect of the present invention, in a vertical cross sectional diagrammatical view of the main portion; FIG. 2-1 is a cross sectional diagrammatical view taken along line A—A in FIG. 1; FIG. 2-2 is a cross sectional diagrammatical view taken along line B—B in FIG. 1; and FIG. 2-3 is a cross sectional diagrammatical view taken along line C—C in FIG. 1. FIGS. 3-1 to 3-4 are cross sectional diagrammatical views of the first reaction zone illustrating the manner for dividing the axial stream of the high temperature combustion gas. FIG. 4 is a vertical cross sectional diagrammatical view of the second reaction zone illustrating the feed nozzles; and FIG. 5 is a view illustrating the direction of the introduction of the hydrocarbon feedstock.

Now, the practical operation of the present invention for producing carbon black by means of the production reactor shown in FIG. 1, etc. will be described. Referring to FIG. 1 and FIG. 2-1, combustion nozzles include four combustion nozzles 9 having an oxygen containing gas inlet 8, as outer nozzles. These four outer nozzles are adapted so that four of them can collectively be operated. Further, as inner combustion nozzles, four combustion nozzles 11 having an oxygen containing gas inlet 10 are provided inside, and these four inner nozzles are also adapted so that four of them can collectively be operated. These combustion nozzles 9 and 11 are adapted so that they can advance and retreat in the reactor. The high temperature combustion gas formed by the combustion by means of such inner and outer combustion nozzles forms inner and outer gas streams differing in the spouting velocity and/or the spouting gas temperature. Namely, as shown in FIG. 3-1, two independent streams i.e. the inner high temperature gas stream (a) and the outer high temperature gas stream (b) are introduced from the first reaction zone 3 to the second reaction zone 4 in the form of axial streams flowing in substantially the same direction as the axial direction of the reactor.

Further, FIGS. 3-2, 3-3 and 3-4 illustrate other embodiments for dividing the axial stream into independently divided streams. Such various embodiments for division may suitably be selected depending upon the type of the hydrocarbon feedstock or the desired physicochemical properties of carbon black to be produced (i.e. depending upon the desired quality or application of the carbon black), and the spouting velocities and the spouting gas temperatures of the independent streams may also be suitably selected depending thereon.

To the axial streams of the high temperature combustion gas introduced into the second reaction zone, a hydrocarbon feedstock is introduced from feed supply nozzles 6. The direction for their introduction traverses the high temperature combustion gas streams as axial streams. However, the direction for the introduction is not necessarily perpendicular to the axial streams, and a suitable angle within a range of from 20 to 150° relative to the axis of the reactor may be selected as shown in FIG. 5.

The feed supply nozzles 6 may be provided symmetrically as between the left and the right, as shown in FIG. 2-2. Otherwise, the feed supply nozzle 6 is provided only on one side, as shown in FIG. 2-3. The nozzles 6 may be used in various manners such that nozzles $6_1$ to $6_3$ disposed at different positions in the second reaction zone 4 as shown in FIG. 4 may be used $6_1$ alone, $6_2$ alone, $6_3$ alone, $6_1$ and $6_2$ in combination, $6_2$ and $6_3$ in combination, or $6_1$ and $6_3$ in combination. In general, the feed supply nozzles 6 are preferably provided in at least three sets at different positions in the second reaction zone, and each set preferably contains a plurality of nozzles. Such feed supply nozzles 6 are adapted so that they are capable of advancing and retreating in the reactor.

A carbon black-containing hot suspension stream formed in the second reaction zone 4, is then introduced into the third reaction zone 5, where it is quenched with water spouted from a water spray 7 for terminating the reaction disposed at an optional position, to terminate the reaction, and then carbon black is recovered via collecting apparatus such as a cyclone, a bagfilter, etc.

(B) Now, the second aspect of the present invention will be described in detail with reference to an apparatus illustrated for the description of the practical embodiment of the second aspect of the invention.

Figure 6:
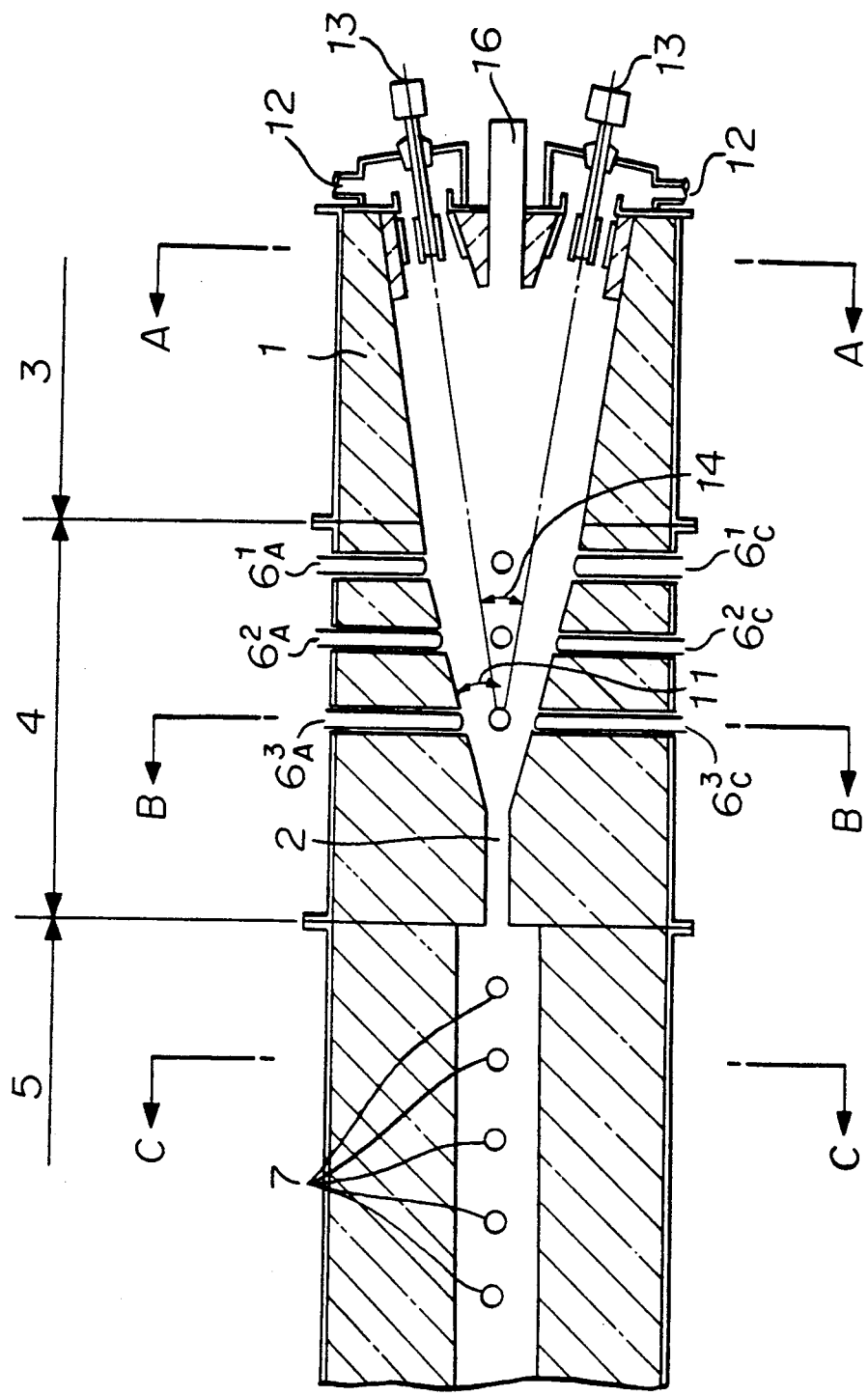
FIG. 6 is a vertical cross sectional diagrammatical view of the main portion of a carbon black production reactor illustrating the second aspect of the present invention.
Figure 7:
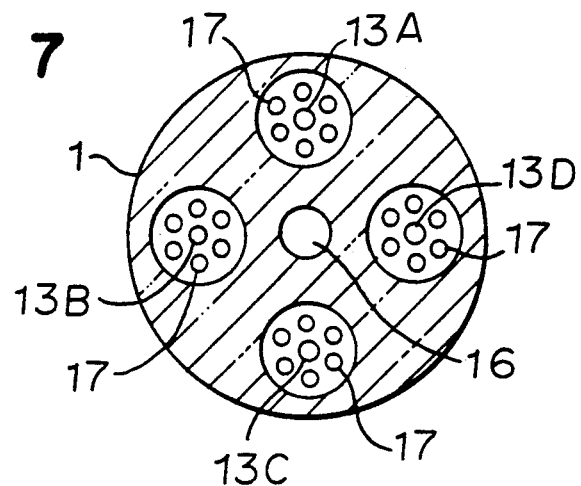
FIG. 7 is a cross sectional diagrammatical view taken along line A—A in FIG. 6.
Figure 8:
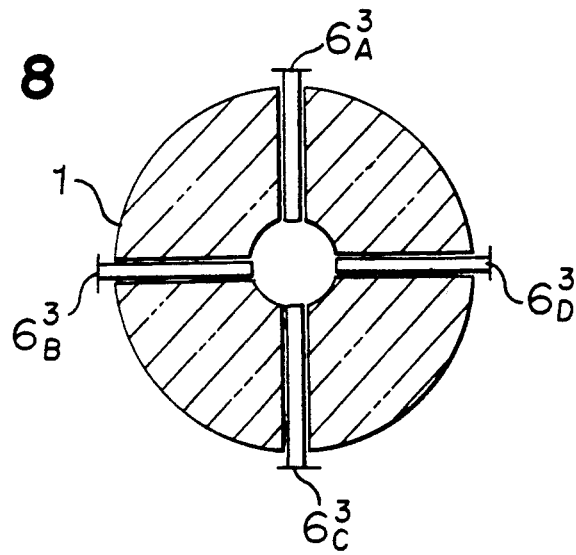
FIG. 8 is a cross sectional diagrammatical view taken along line B—B in FIG. 6.
Figure 9:
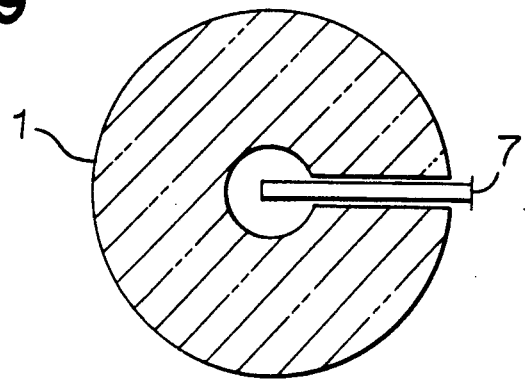
FIG. 9 is a cross sectional diagrammatical view taken along line C—C in FIG. 6.
Figure 10A:
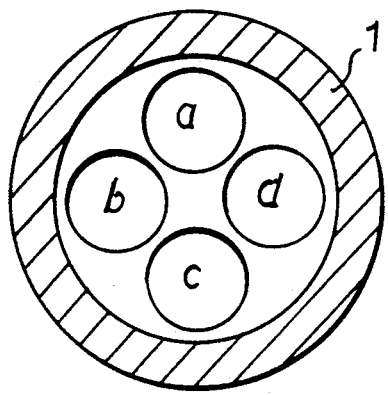
FIG. 10A is a cross sectional diagrammatical view of the first reaction zone in the apparatus of FIG. 6 in operation showing one embodiment of the division of the high temperature combustion mixture.

FIG. 6 is a vertical cross sectional diagrammatical view illustrating an embodiment of the carbon black production apparatus useful for the second aspect of the present invention; FIG. 7 is a cross sectional diagrammatical view taken along line A—A in FIG. 6; FIG. 8 is a cross sectional diagrammatical view taken along line B—B in FIG. 6; and FIG. 9 is a cross sectional diagrammatical view taken along line C—C in FIG. 6. Reference numeral 1 indicates the main body of the production reactor, numeral 2 indicates a throat, numeral 3 indicates a first reaction zone, numeral 4 indicates a second reaction zone, and numeral 5 indicates a third reaction zone. FIG. 10A is a cross sectional diagrammatical view of the first reaction zone when the carbon black production reactor shown in FIGS. 6 to 9 is in operation, wherein symbols (a) to (d) indicates the divided streams of the high temperature combustion mixture.

The carbon black production reactor shown in FIGS. 6 to 10A, is provided with four high combustion mixture-generating systems. The fuel supply nozzles 13A to 13D of the respective generating systems are constructed so that they are capable of spouting the high temperature combustion mixtures to optional positions in the first reaction zone 3 and the second reaction zone 4. Accordingly, the high temperature combustion mixtures (independent streams) formed by the spouting from the fuel supply nozzles 13A to 13D are permitted to collide (or intersect) with each other at optional positions in the first reaction zone 3 or the second reaction zone 4. The position of the collision is preferably in the center axis of the reactor and at the same position as the introduction of the hydrocarbon feedstock or down stream thereof. The collision (or intersection) angle is shown by reference numeral 14 in FIG. 6. The angle 14 is usually from 15 to 30°, but is not limited to such a range.

Further, the reactor wall in the second reaction zone 4 is shaped so that it is gradually constricted in the reaction zone 4. The constriction angle (the angle shown by reference numeral 11 in FIG. 6) of the reactor wall to the reactor axis is usually from 5 to 80°, preferably from 10 to 40°.

To produce carbon black by means of the carbon black production reactor shown in FIG. 6, firstly a fuel is introduced from the respective fuel supply nozzles 13A to 13D, and an oxygen-containing gas (e.g. air) is introduced via oxygen-containing gas inlets 12 and oxygen-containing gas spouts 17 (see FIG. 7). The high temperature combustion mixture streams (independent streams) formed by the combustion of the fuel with the oxygen-containing gas, are permitted to collide (or intersect) on the axis of the reactor in the second reaction zone 4, whereby turbulence is generated in the vicinity of the collision to readily form a region where the $(1_K)_{min}$ exists. FIG. 10A illustrates the respective independent streams (a) to (d) in such a case. The formation of the independent streams and the collision thereof may be carried out as illustrated i.e. four independent streams (a) to (d) are formed and permitted to collide with one another. Otherwise, the independent streams (a) and (c) may be formed and permitted to collide with each other, or the independent streams (b) and (d) may be formed and permitted to collide with each other.

Figure 10B:
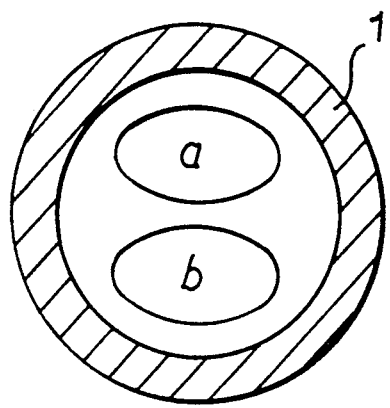
FIGS. 10B to 10D are cross sectional diagrammatical views of the first reaction zone showing other embodiments of the division of the high temperature combustion mixture.
Figure 10C:
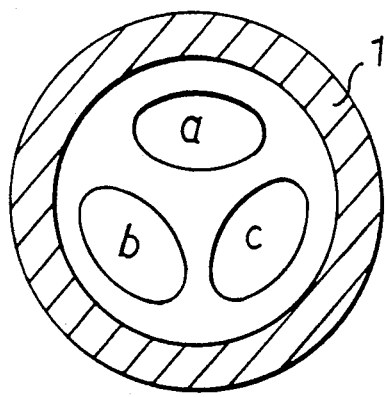
Figure 10D:
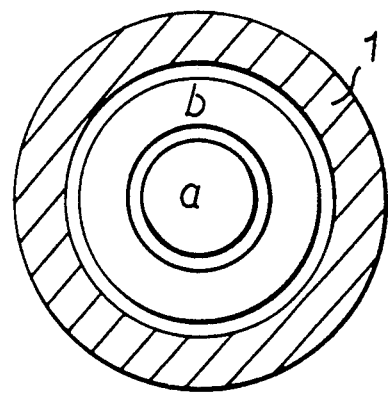

The formation of the divided independent streams and the collision thereof may be carried out in various manners. FIGS. 10B, 10C and 10D illustrate other embodiments of the independent streams. With respect to the manner of collision of the independent streams, in addition to the collision at one location on the axis of the reactor, another mode of collision such as the collision at two or more locations on the axis of the reactor, or the collision at two or more locations other than on the axis of the reactor, is possible.

As shown in FIG. 6, the reactor wall in the second reaction zone is constructed to have a shape so that the reaction zone 4 is gradually constricted towards the throat 2. With this construction, it is possible to effectively generate turbulence created by the collision of the independent streams.

As shown in FIGS. 6 and 8, a total of 12 hydrocarbon feedstock supply nozzles are provided in the second reaction zone 4. Namely, a total of 4 nozzles extending from the top, bottom, left and right are provided at each of the three stages of the upstream, the intermediate stream and the down stream of the high temperature combustion mixture streams, to present a total of 12 nozzles (more specifically, a total of 12 nozzles comprising nozzles $6^1A$ to $6^1D$, $6^2A$ to $6^2D$ and $6^3A$ to $6^3D$). Each nozzle is disposed so that the hydrocarbon feedstock can be introduced from the direction traversing the high temperature combustion mixture streams in the second reaction zone. Accordingly, the hydrocarbon feedstock can be introduced by these supply nozzles from a direction traversing the combustion mixture streams in the region of the second reaction zone where the $(1_K)_{min}$ exists, which is formed by the above-mentioned collision of the independent streams and by the reaction zone having a constricted shape. The introduced hydrocarbon feedstock is readily dispersed in the entire region where the $(1_K)_{min}$ exists and mixed to form carbon black extremely effectively, whereby the control of the reaction for the formation of the carbon black is facilitated.

The twelve hydrocarbon feedstock nozzles as illustrated in FIGS. 6 and 7 may be used all at once for the introduction of the feedstock. Otherwise, the feedstock may be introduced by using the upstream nozzles ($6^1A$ to $6^1D$), the intermediate nozzles ($6^2A$ to $6^2D$) or the down stream nozzles ($6^3A$ to $6^3D$) alone. Or, the feedstock may be introduced by using a combination of the upstream nozzles and the intermediate nozzles, a combination of the upstream nozzles and the down stream nozzles or a combination of the intermediate nozzles and the down stream nozzles. Further, it is possible to control the physical properties (types) of the resulting carbon black also by controlling the manner of the division or collision of the independent streams, or the manner of introducing the hydrocarbon feedstock in relation with other conditions such as the flow rates of the fuel or the oxygen-containing gas.

Figure 11:
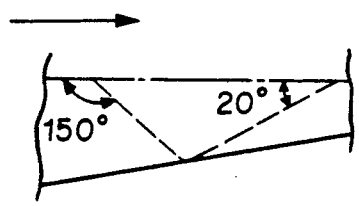
FIG. 11 is a view illustrating the direction of the introduction of the hydrocarbon feedstock.

The feedstock from the hydrocarbon feedstock nozzles is introduced in a direction traversing the high temperature combustion mixture streams. The direction traversing the high temperature combustion mixture streams is not limited to a direction perpendicular to the high temperature combustion mixture streams. As shown in FIG. 11, the direction for the introduction of the hydrocarbon feedstock is optionally selected within a wide range of from 20 to 150° relative to the reactor axis.

Further, the hydrocarbon feedstock nozzles are preferably constructed so that they may be optionally adjustable for insertion more deeply or shallowly in the reactor than shown in FIGS. 6 to 8, because, the physical properties of the resulting carbon black may be controlled to some extent by controlling the positions for the insertion of the feedstock nozzles in the reactor.

The reaction mixture streams in which carbon black is formed in the second reaction zone, is then introduced to a third reaction zone 5 via the throat 2. In the third reaction zone 5, quenching water spray nozzles 7 are provided in a conventional manner. The reaction mixture is cooled with the quenching water sprayed from the quenching water spray nozzles 7 to terminate the reaction. After the termination of the reaction, the reaction product is sent to a collecting apparatus such as a cyclone or a bagfilter, whereby the formed carbon black is collected and recovered.

With use of the process and the apparatus of the present invention, it is possible to effectively form a region where the $(1_K)_{min}$ exists in the second reaction zone. In the second reaction zone where the $(1_K)_{min}$ exists, the hydrocarbon feedstock is introduced in a direction traversing the high temperature combustion mixture streams, whereby the reaction for the formation of carbon black can efficiently be conducted. Further, the control of the physical properties (accordingly the types) of the resulting carbon black will be easy (particularly by controlling or changing) the manner of the division or collision of the high temperature combustion mixture streams, controlling (or changing) of the flow rate of the fuel or the flow rate of the oxygen-containing gas, or controlling other conditions such as the position for the introduction of the hydrocarbon feedstock in correspondence to the control of these factors. For example, it becomes very easy to control the particle size, the particle size distribution, the aggregate size or the aggregate size distribution optionally to produce a carbon black suitable for incorporation to a coating material or resin excellent in the blackness or the color tone, or to produce a carbon black having excellent reinforcing properties for e.g. rubber.

Now, the present invention will be described in further detail with reference to Examples and Comparative Examples.

The tests of carbon blacks produced in these Examples and Comparative Examples, were conducted by the following methods.

(1) Tinting strength

A constant temperature-dried sample and zinc white are accurately weighed in amounts of 20 mg and 2 g, respectively, and 2.7 ml of mineral oil is added thereto. Then, the mixture is kneaded by means of an Hoover Automatic Muller to obtain a sample paste. This paste is visually compared and evaluated with a standard paste prepared in a similar manner.

(2) Particle size and particle size distribution

Sample carbon black is put in chloroform and dispersed by irradiation with supersonic waves of 200 kHz for 20 minutes. Then, the dispersed sample is fixed on a support film, observed and photographed by an electron microscope. Then, the particle size and the standard deviation are calculated from the average surface area and represented by $m\mu m$ or Å.

(3) Specific surface area by nitrogen absorption

By means of a low temperature nitrogen absorption apparatus (Quantasorb Surface Area Analyzer, manufactured by Quantachrom Co., U.S.A.), the nitrogen absorption by carbon black is measured by a low temperature nitrogen adsorption method, and the specific surface area is calculated from the measured value by using a BET 1 point method and represented by $m^2/g$.

(4) Dibutylphthalate absorption

The dibutylphthalate absorption is measured in accordance with JIS K-6221-1982 and hereinafter referred to as "DBP absorption".

(5) 24 M4 DBP absorption

A constant temperature-dried sample is weighed in a prescribed amount and held under a pressure of 1,687 $kg/cm^2$ for 5 seconds for compression. Then, this sample is screened by a 16 mesh screen. This operation is repeated 4 times, and then DBP absorption is measured in accordance with JIS K-6221-1982.

(6) Iodine adsorption

The iodine adsorption is measured in accordance with JIS K-6221-1982.

(7) Aggregate size and aggregate size distribution

Disk Centrifuge (manufactured by Joyce Loebl Company, UK) is used.

Five mg of carbon black is added to a 20% ethanol aqueous solution containing a small amount of a dispersant and completely dispersed by supersonic treatment. The rotary disk having 10 ml of a spinning liquid (water) injected, is adjusted to 8,000 ppm, and 0.5 ml of the above dispersion is injected. The turbidity detected by photo electric photometry is recorded by a histogram relative to the time. The most frequented particle size of the frequency distribution curve thereby obtained is represented by Å as the aggregate size, and the half the width of the frequency distribution curve is represented by Å as the aggregate size distribution.

EXAMPLES 1 TO 4

By using a carbon black production reactor having a structure as shown in FIGS. 1, 2-1 and 2-2, the reactions were conducted under the production conditions as shown in Table 1, and the reactions were terminated by spraying quenching water, and carbon blacks were recovered by means of a cyclone and a bagfilter. The physical properties of the respective carbon blacks thus obtained are as shown in Table 1.

The general specification of the carbon black production reactor employed, and the fuel and the hydrocarbon feedstock used were as follows.

(1) Carbon black production reactor

Length of the first reaction zone 3: 0.65 m
Inner diameter of the first reaction zone 3: 0.45 m
Number of outer combustion nozzles 9: 4 nozzles
Number of inner combustion nozzles 11: 4 nozzles
Length of the second reaction zone 4: 1.15 m
Inner diameter of the throat: 0.07 m
Number of feed supply nozzles: Total of 2 nozzles (2) Fuel Type: Coal gas

| Composition (volume %) | |
| --- | --- |
| $CO_2$ | 2.0 |
| $O_2$ | 0.5 |
| $C_nH_m$ | 3.0 |
| CO | 6.6 |
| $H_2$ | 54.0 |
| $CH_4$ | 28.7 |
| $N_2$ | 5.2 |

(3) Feedstock

Type: Creosote oil
Specific gravity: 1.100
Carbon content (wt %): 90.5
Hydrogen content (wt %): 6.3
Viscosity (50° C.): 10 cps

COMPARATIVE EXAMPLES 1 AND 2

Carbon blacks were prepared under the conditions as identified in Table 1 by using a conventional carbon black production reactor of the type wherein a high temperature combustion gas is introduced into the first reaction zone from two directions as tangential streams and the hydrocarbon feedstock is introduced from the direction of the reactor axis by a burner provided with a cooling jacket. The results are shown in Table 1.

COMPARATIVE EXAMPLE 3

Carbon black was prepared in the same manner as in Example 1 except that the amount of air and the amount of fuel for the outer and inner combustion nozzles in Example 1 were changed as shown in Table 1, and the outer combustion gas spouting velocity and the inner combustion gas spouting velocity were made substantially the same, and spouting was conducted so that the outer and inner combustion gas spouting streams were in parallel to each other. The results were as shown in Table 1.

TABLE 2

| Type of the fuel: Coal gas Composition (volume %): | |
| --- | --- |
| $CO_2$ | 2.0 |
| $O_2$ | 0.5 |
| $C_nH_m$ | 3.0 |
| CO | 6.6 |
| $H_2$ | 54.0 |
| $CH_4$ | 28.7 |
| $N_2$ | 5.2 |

TABLE 1

| | | Examples | | | | Comparative Examples | | |
| --- | --- | --- | --- | --- | --- | --- | --- | --- |
| Items | | 1 | 2 | 3 | 4 | 1 | 2 | 3 |
| Production conditions | Total amount of air for combustion (Nm³/hr) | 900 | 900 | 900 | 900 | 900 | 900 | 900 |
| | Amount of air for outer combustion nozzles (Nm³/hr) | 450 | 450 | 630 | 270 | — | — | 747 |
| | Amount of air for inner combustion nozzles (Nm³/hr) | 450 | 450 | 270 | 630 | — | — | 153 |
| | Total amount of fuel (Nm³/hr) | 150 | 150 | 150 | 150 | 150 | 150 | 150 |
| | Amount of fuel for outer combustion nozzles (Nm³/hr) | 75 | 75 | 105 | 45 | — | — | 124.5 |
| | Amount of fuel for inner combustion nozzles (Nm³/hr) | 75 | 75 | 45 | 105 | — | — | 25.5 |
| | Inner/outer high temp. combustion gas ratio *1 | 1/1 | 1/1 | 3/7 | 7/3 | — | — | 1.7/8.3 |
| | Spouting velocity of outer high temp. gas stream (m/sec) *2 | 128 | 128 | 179 | 77 | — | — | 44 |
| | Spouting velocity of inner high temp. gas stream (m/sec) *3 | 27 | 27 | 16 | 37 | — | — | 44 |
| | Amount of hydrocarbon feedstock (kg/hr) | 155 | 177 | 150 | 150 | 117 | 124 | 145 |
| | Amount of quenching water for terminating reaction (kg/hr) | 350 | 350 | 350 | 350 | 200 | 240 | 350 |
| Yield and physical properties | Carbon black production rate (kg/hr) | 85 | 101 | 81 | 82 | 55 | 64 | 75 |
| | Yield per feedstock (wt %) | 55 | 57 | 54 | 54 | 47 | 52 | 51 |
| | Tinting strength (%) | 132 | 128 | 123 | 129 | 128 | 125 | 126 |
| | Iodine adsorption (mg/g) | 147 | 118 | 140 | 138 | 144 | 116 | 140 |
| | DBP adsorption (ml/100 g) | 125 | 126 | 125 | 129 | 126 | 124 | 123 |
| | 24M4 DBP adsorption (ml/100 g) | 99.0 | 97.0 | 104.0 | 106 | 101.5 | 99.0 | 96.0 |
| | Specific surface area by nitrogen adsorption (m²/g) | 134.0 | 103.2 | 127.1 | 125.1 | 130.1 | 104.9 | 133 |
| | Particle size (mμm) | 23 | 25 | 24 | 23 | 26 | 28 | 26 |

Notes to Table 1
*1: Ratio of (amount of air for inner combustion nozzles + amount of fuel for the same)/(amount of air for outer combustion nozzles + amount of fuel for the same).
*2 and *3: The spouting velocity is an average velocity in front of the spouting outlet and was obtained by calculation from the gas volume and the inner diameter of the spouting outlet.
As is evident from the results in Table 1, according to the Examples of the present invention, it is possible to produce carbon blacks having various characteristics by using the same production reactor, the yield per feedstock is high, and yet it is possible to obtain carbon black having a small particle size.

EXAMPLE 5

The carbon black production reactor as shown in FIGS. 6, 7, 8, 9 and 10A, was used. The dimensions of the major portions of this production reactor were as follows:

(1) First reaction zone 3

Length: 900 mm
Distance between fuel supply nozzles (Distance between 13A and 13C): 500 mm (2) Second reaction zone 4

Inner diameter of the inlet: 400 mm
Diameter of the throat: 70 mm
Length of the throat: 330 mm
Distance between feedstock supply nozzles (Distance between 6¹A and 6³A): 500 mm
Constriction angle of the reactor wall (15 in FIG. 6): 15°

(3) Third reaction zone 5

Inner diameter: 250 mm
Locations of spray nozzles: 110 mm, 340 mm, 570 mm, 800 mm and 1,100 mm from the abruptly expanded portion at the outlet of the throat Carbon black was produced by using the above production reactor, the fuel shown in Table 2 and the hydrocarbon feedstock shown in Table 3 under the production conditions as identified in Table 4.

TABLE 3

| Type of the feedstock: | Creosote oil |
| --- | --- |
| Specific gravity (15° C.): | 1.100 |
| Carbon content (wt %): | 90.5 |
| Hydrogen content (wt %): | 6.3 |
| Viscosity (50° C.): | 10 cp |

In this Example 5, the feedstock was introduced through the four nozzles at the third stage i.e. nozzles 6³A to 6³D.

This Example 5 was conducted for the purpose of producing carbon black of ISAF class disclosed in Table 8.1 (Physicochemical Properties of Carbon Black) on Page 155 of Carbon Black Handbook [Nov. 25, 1971 (first edition), published by Kabushiki Kaisha Tosho Shuppansha, compiled by Carbon Black Association]. However, the physical properties of the obtained carbon black were as shown in Table 4, and particles having a smaller particle size than the ISAF class disclosed in the above handbook, were obtained.

EXAMPLE 7

This Example was conducted also for the purpose of producing carbon black of ISAF class. The same conditions as in Example 6 were employed except that the operational conditions were changed as identified in Table 4. Particularly, the collision angle of the independent streams was changed to 29° to generate a $(1_K)_{min}$ region upstream of the position where the hydrocarbon feedstock was introduced.

The physicochemical properties of the carbon black thereby obtained are shown in Table 4. As compared with the carbon black obtained in Example 6, the particle size was substantially the same, but the particle size distribution increased.

EXAMPLE 8

In this Example, the same conditions as in Example 6 were employed except that the conditions as identified in Table 4 were used. Particularly, in this Example, only two fuel supply nozzles (nozzles 13A and 13C) were used.

Now the properties of the carbon black thereby obtained are shown in Table 4. As compared with the carbon black obtained in Example 6, the aggregate size and the aggregate size distribution increased.

EXAMPLE 9

In this Example, the position for the introduction of the feedstock was changed to upstream in order to increase the time for the decomposition of the hydrocarbon feedstock. Namely, as the feedstock supply nozzles, four nozzles at the first stage i.e. nozzles $6^1$A to $6^1$D were employed. Other conditions were also changed as shown in Table 4, and the rest of the conditions was the same as in Example 7.

The physical properties of the carbon black of thereby obtained are shown in Table 4.

As compared with the carbon black obtained in Example 7, the carbon black thereby obtained had substantially the same iodine adsorption, but the particle size increased.

TABLE 4

| Items | | Examples | | | |
|---|---|---|---|---|---|
| | | 6 | 7 | 8 | 9 |
| Production conditions | Amount of air for combustion (Nm³/hr) | 1000 | 1000 | 1000 | 1000 |
| | Temp. of air for combustion (°C.) | 100 | 98 | 102 | 101 |
| | Amount of fuel (Nm³/hr) | 165 | 165 | 165 | 165 |
| | Number of independent streams of high temp. combustion mixture | 4 | 4 | 2 | 4 |
| | Collision ange (°) of independent streams | 18 | 29 | 18 | 29 |
| | Amount of feedstock (Kg/Hr) | 150 | 140 | 135 | 110 |
| | Decompostion time of feedstock (m sec) | 40 | 40 | 40 | 48 |
| Yield and physical properties | Iodine adsorption (mg/g) | 113 | 110 | 112 | 111 |
| | DBP adsorption (cc/100 g) | 160 | 155 | 150 | 150 |
| | Particle size (Å) | 190 | 195 | 200 | 240 |
| | Particle size distribution (Å) | 53 | 60 | 63 | 72 |
| | Aggregate size (Å) | 900 | 950 | 1100 | 1200 |
| | Aggregate size distribution (Å) | 950 | 1000 | 1200 | 1250 |

As is evident from the comparison of the Examples (Table 4), it was possible to control the physicochemical properties (types) of the resulting carbon black in various ways by letting the plurality of independent streams of the high temperature combustion mixture formed in the first reaction zone, in the second reaction zone, introducing the feedstock from a direction traversing the high temperature combustion mixture streams in the second reaction zone i.e. the region where the $(1_K)_{min}$ exists, which is formed by the collision and by the constricted shape of the second reaction zone and reacting the feedstock and by controlling (or changing) the independent streams or the manner of collision of the independent streams or controlling (or changing) the manner of supplying the feedstock in correspondence with the independent streams or the manner of collision thereof. Thus, by means of the process and the apparatus of the present invention, carbon blacks of various types suitable for various applications can be readily and efficiently be produced as the case requires.

According to the process of the present invention, excellent furnace carbon black having desired physical properties depending upon the particular use can be produced with high efficiency.

We claim:

1. A process for producing carbon black by means of a reactor comprising a first reaction zone in which by a high temperature combustion mixture-generating system, an oxygen-containing gas and a fuel are mixed to form a hot combustion mixture stream, a second reaction zone having a throat in which the hot combustion mixture stream thus obtained, is mixed with a hydrocarbon feedstock to form carbon black, and a third reaction zone located downstream and continuous from the second reaction zone in which quenching water is sprayed to terminate the reaction, said process comprising the steps of:

introducing axial streams of oxygen-containing gas and fuel into said first reaction zone through axially extending supply nozzles so as to cause the collision of the axial streams at the axis of said reactor in the first and second reaction zones, in order to mix said fuel and said oxygen containing gas in said first reaction zone and create a plurality of hot combustion mixture streams in said reactor, said first reaction zone defining an axially gradually constricted shape and said second reaction zone defining a first part having a gradually constricted shape which extends from said first reaction zone so as to continuously constrict the hot combustion mixture streams in the first and second reaction zones for causing said collision, and a second part having a throat; and introducing the hydrocarbon feedstock in the first part of said second reaction zone from a direction traversing the hot combustion mixture streams in order to mix said hydrocarbon feedstock and said hot combustion gas streams and create a carbon black containing hot suspension stream.

2. The process according to claim 1, wherein said plurality of streams of the high temperature combustion mixture are directed to collide with each other at an angle of from 15° to 30°.

* * * * *